UNITED STATES PATENT OFFICE.

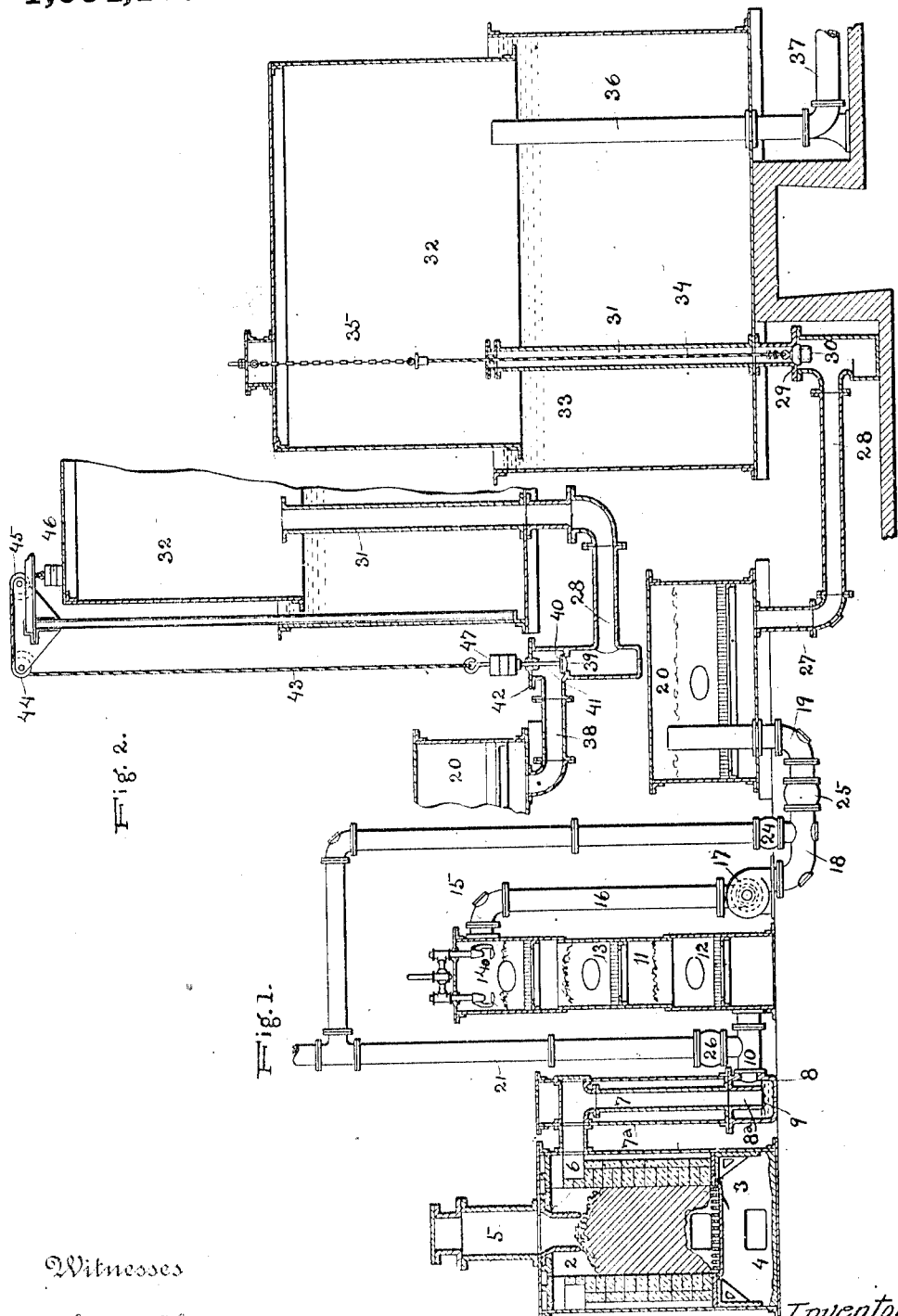

CONSTANTINE LEE STRAUB, OF MILWAUKEE, WISCONSIN, ASSIGNOR TO POWER AND MINING MACHINERY COMPANY, OF NEW YORK, N. Y., A CORPORATION OF NEW JERSEY.

GAS PLANT.

1,064,107.  Specification of Letters Patent.  Patented June 10, 1913.

Application filed August 16, 1906. Serial No. 330,854.

*To all whom it may concern:*

Be it known that I, CONSTANTINE L. STRAUB, a citizen of the United States, residing at Milwaukee, in the county of Milwaukee and State of Wisconsin, have invented certain new and useful Improvements in Gas Plants, of which the following is a specification, reference being had therein to the accompanying drawing.

This invention relates to improvements in apparatus for producing gas from coal, such apparatus including the producer furnace, means for purifying the gas, means for causing its passage through part of its course by suction, and through other parts thereof under pressure, and means for storing it after it has been generated and cleansed.

Figure 1 is a longitudinal section of an apparatus embodying my improvements; Fig. 2 is a section of part of the apparatus when made in a modified form.

The drawings illustrate a series of mechanisms which are shown connected together to constitute the gas plant. Some of these, considered as component elements, are or may be of any of the well known forms. But I will here refer to them briefly, in order that the improvements to which the present invention relates may be fully understood.

1 indicates as an entirety a producer furnace having the fuel chamber 2, the grate at 3, and the ash pit at 4, the furnace being fed from the hopper indicated by 5. In some respects the present improvements are particularly well adapted for the treatment of anthracite coal in the manufacture of gas, such as used for the operation of engines. But it is to be understood that other gas producing materials can be employed and hence there can be variation in respect to the parts, without departing from the invention.

The gas which is generated in the producer at 1 is taken off at the top through the exit passage 6, and is delivered to the vaporizer having the vertical down tube 7 in the cylinder 7ª, there being at the bottom a body of water 9 held in the vessel 8. The tube 7 has an extension 8ª which extends down to or slightly under the surface of the water at 9, these parts acting in the well known manner incident to vaporizers of this sort.

From the vaporizer the gas passes to the duct at 10, then either through the purge pipe at 21 or through the scrubber 11. The scrubber is, or may be, so far as concerns its details, constructed in any well known or suitable manner. As shown, it has trays or shelves at 12 and 13, some or all of which are adapted to hold the scrubbing materials ordinarily used. At 14 it is provided with the usual spraying apparatus. The gas passing through the scrubber is taken off at the outlet 15, and through the down pipe 16, and is delivered to the suction and pressure mechanism at 17. This, as illustrated, has a fan, to the eye of which the gas is delivered by the pipe 16. From its mouth it is forced through the duct 18 to the duct 19, and is by the latter delivered to the interior of the dry scrubber 20. This part of the apparatus can also be made in any preferred way.

From the dry scrubber the gas passes through the ducts 27 and 28 to the gas holder, it first passing through the duct 28 to that at 31, which enters the holder drum 32, the latter being adapted to rise and fall through the liquid receptacle 33. The gas, to enter the vertical pipe 31, must pass the valve seat 29 of the valve 30. To this valve is connected a flexible support, such as a cable 34, or chain 35, or a support formed partly of one and partly of the other. This flexible support 34—35 is connected to the top of the holder 32, and is of such length that when the holder is in its uppermost position it draws the valve up tightly against the seat 29 and stops the passage of gas. When the holder is empty, or partially filled, the flexible holder settles down in the pipe 31, permitting the valve to move away from its seat 29, and at such times the gas passage to the holder is unobstructed. The gas is taken from the holder through the exit duct 36 and the gas outlet 37 to the engine or other point of consumption.

In some cases I prefer to provide the holder with a valve-controlling mechanism situated entirely outside of the holder. By referring to Fig. 2 it will be seen that the gas can be taken from the dry scrubber 20 through the exit duct 38, and can travel thence past the valve seat 39 to the above described duct 28 and to the interior of the holder 32. The valve 40 is carried by a rod 41 which passes through a tight cover 42 at the top of the valve box. The valve and its rod 41 are connected to a flexible support, such as the section of cable 43, which extends over the sheaves or pulleys at 44—45, and is provided with a weight 46 at its upper end. This weight 46 rests upon the top of the holder. At 47 there is an adjustable weight applied directly to the valve 40, it being preferably a series of disk weights adapted to be attached to or disconnected from the valve stem 41. This weight should be great enough to insure that the valve shall tend to move freely downward, and to rest itself firmly upon the valve seat 39 when the latter is reached; there being danger that the weight of the valve itself will not be sufficient to overcome the friction and resistance from the cover 42 and the sheaves. The weight 46 over-balances the weight of the parts directly adjacent to the valve 40, sufficiently to insure that when the holder 32 is in any position below its uppermost position, this weight will draw up the valve. This form of valve mechanism and controller is in some respects perferable to that first above described, inasmuch as all of the moving parts are outside of the holder, and any parts requiring cleaning or repairing are exposed and easily accessible.

The operation of a plant such as above described will be understood from the drawings and the description above. The fire in the furnace being started, and the proper amount of fuel being supplied, the operation is commenced. By closing the main gas valve at 25 and opening the purge valve at 26, the first gas that passes over can be disposed of in the usual way. After the necessary tests are met the main gas valve leading to the holder can be opened and the purge valve closed. If it is desired to utilize the suction and blast apparatus at 17 during the stage of purging, the valve at 26 can be closed, and that at 24 opened, the main valve at 25 being closed. After gas of the desired quality has commenced to flow, it is delivered to the holder. By placing the combined suction and pressure apparatus, such as the fan at 17, at points between the scrubber 11 and the dry scrubber 20, I force the passage of the gas from the producer, vaporizer or pre-heater through the scrubber under suction, and maintain the advantages well known to be incident to that arrangement of parts. Then by forcing the gas from the fan under pressure through the dry scrubber, and the ducts, to the holder, I secure important additional advantages. I provide a plant which is under automatic control throughout so far as the generation of gas is concerned. As the holder fills and nears its extreme upper position, the valve at 30, or 40, is closed upon its seat, and the inlet of gas is shut off. Then the fan at 17 works idly, taking only the small amount of power required to circulate the gas between its impellers about in its casing, but is ready to quickly start the flow of gas through the producer and the wet scrubber the instant that it is needed for again supplying the holder. After a sufficient amount of gas has been withdrawn from the holder to permit it to drop, the automatic valve at 30, or 40, moves away from its seat, and the fan immediately resumes its action of drawing the gas from the producer and forcing it under pressure to the holder.

With a plant and system of operation such as above described, I obviate the necessity of storing a large amount of gas to cover a long period of consumption; reduce the expense incident to its construction, and simplify the manipulations that are necessary to operate it. The producing or generating is stopped immediately upon the stoppage of the engine or other means of consumption, but as there can be no gas pressure back through the pipes and on the fire to deaden it, the producer is maintained in normal generating condition during comparatively long stops.

What I claim is:

In a gas plant, the combination of the generator or producer, the initial scrubber mechanism, the supplementary scrubber mechanism, the conduits connecting in series the three mentioned mechanisms, a propeller fan located in the conduit between the initial and supplementary scrubber mechanisms, the variable capacity holder having a movable element, a conduit connecting the supplementary scrubber mechanism and the holder, and the cut-off valve in the connection between the supplementary scrubber and the holder actuated by the movable element of the holder, substantially as set forth, the said fan drawing the gas by suction from the generator into the initial scrubber mechanism and then forcing it under pressure through the supplementary scrubber and into the holder when the automatic valve is open, said fan being inoperative when the valve is closed.

In testimony whereof I affix my signature, in presence of two witnesses.

CONSTANTINE LEE STRAUB.

Witnesses:
E. E. ADAMS,
HAWLEY PETTEBONE.